United States Patent
Coakley

(10) Patent No.: US 11,414,161 B1
(45) Date of Patent: Aug. 16, 2022

(54) MULTI-LAYERED SANDWICH CABLE FAIRING APPARATUS FOR REDUCING FLAPPING

(71) Applicant: United States of America as Represented by the Secretary of the Navy, Arlington, VA (US)

(72) Inventor: David B Coakley, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 65 days.

(21) Appl. No.: 17/163,250

(22) Filed: Jan. 29, 2021

Related U.S. Application Data

(60) Provisional application No. 63/135,034, filed on Jan. 8, 2021.

(51) Int. Cl.
| | |
|---|---|
| *B63B 21/66* | (2006.01) |
| *B32B 7/12* | (2006.01) |
| *B32B 7/022* | (2019.01) |
| *B32B 27/12* | (2006.01) |
| *B32B 27/40* | (2006.01) |
| *B32B 27/08* | (2006.01) |

(52) U.S. Cl.
CPC ............ *B63B 21/663* (2013.01); *B32B 7/022* (2019.01); *B32B 7/12* (2013.01); *B32B 27/08* (2013.01); *B32B 27/12* (2013.01); *B32B 27/40* (2013.01); *B32B 2307/51* (2013.01); *B32B 2307/546* (2013.01)

(58) Field of Classification Search
CPC ......... B63B 21/663; B32B 7/022; B32B 7/12; B32B 27/08; B32B 27/12; B32B 27/40; B32B 2307/51; B32B 2307/546
See application file for complete search history.

(56) References Cited

U.S. PATENT DOCUMENTS

| | | |
|---|---|---|
| 6,517,289 B1 | 2/2003 | Coakley et al. |
| 10,252,780 B2 | 4/2019 | Godoy |
| 10,286,983 B1 | 5/2019 | Coakley |

*Primary Examiner* — Michael C Miggins
(74) *Attorney, Agent, or Firm* — Dave Ghatt

(57) ABSTRACT

A sandwich cable fairing designed for attachment to cables that are towed at operational speeds by marine vessels. The sandwich cable fairing has a seven-layer design that combines layers of elastic, fiber reinforced, and adhesive materials. The fairing dampens the vibration resulting from the frequency of flapping caused by a cable being towed at operational speeds. The layering of materials allows the fairing to have the flexibility to be crushed by cable equipment while maintaining the requisite stiffness to reducing flapping and the resulting vibration.

12 Claims, 4 Drawing Sheets

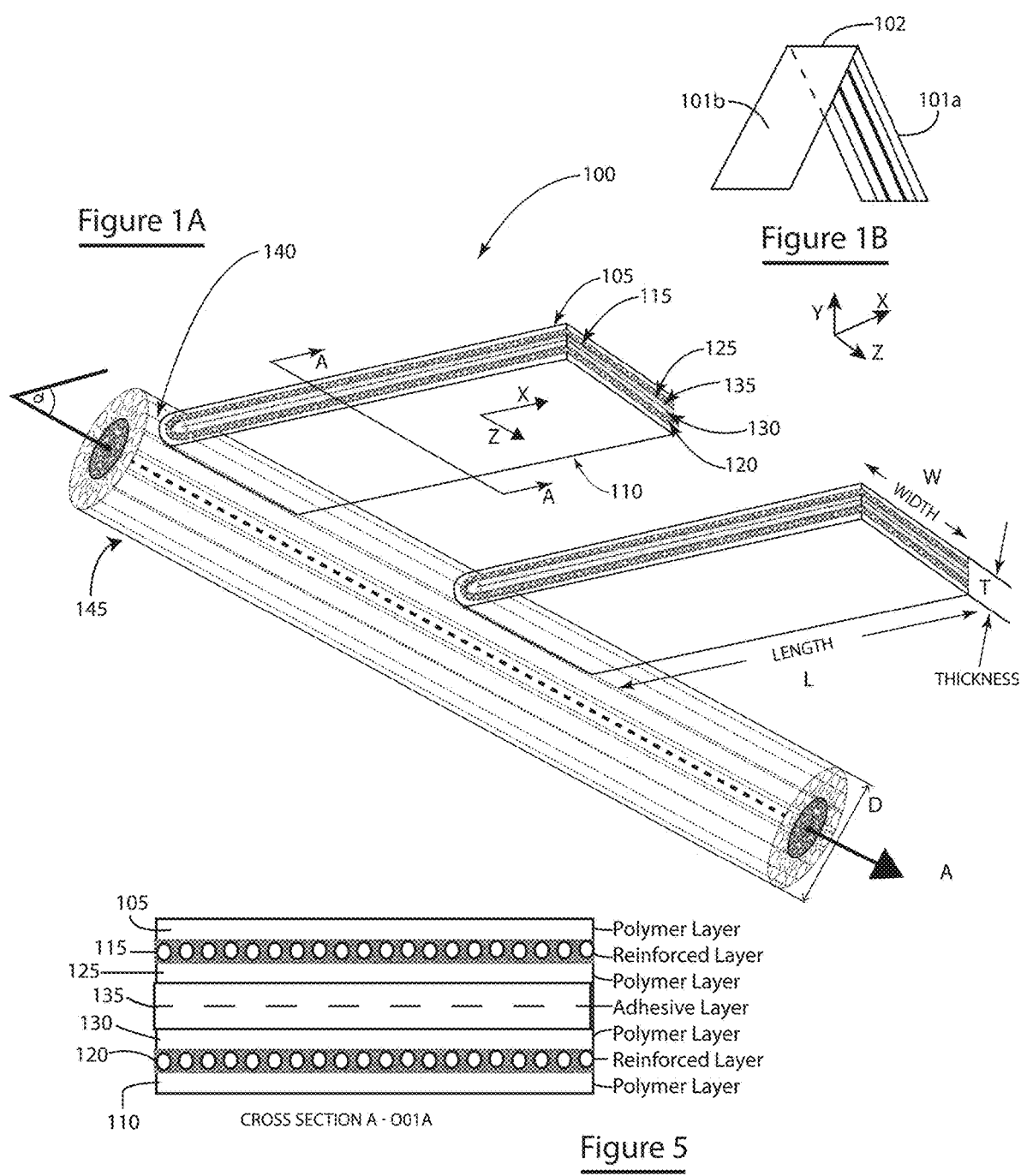

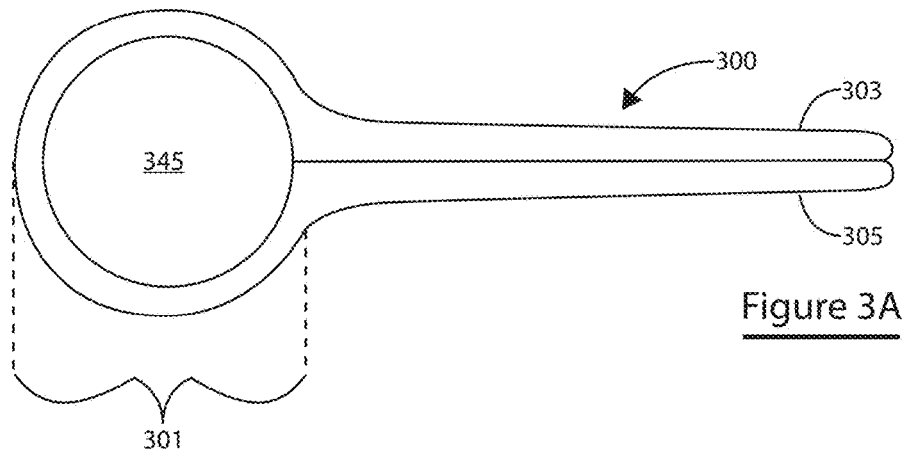
Figure 3A
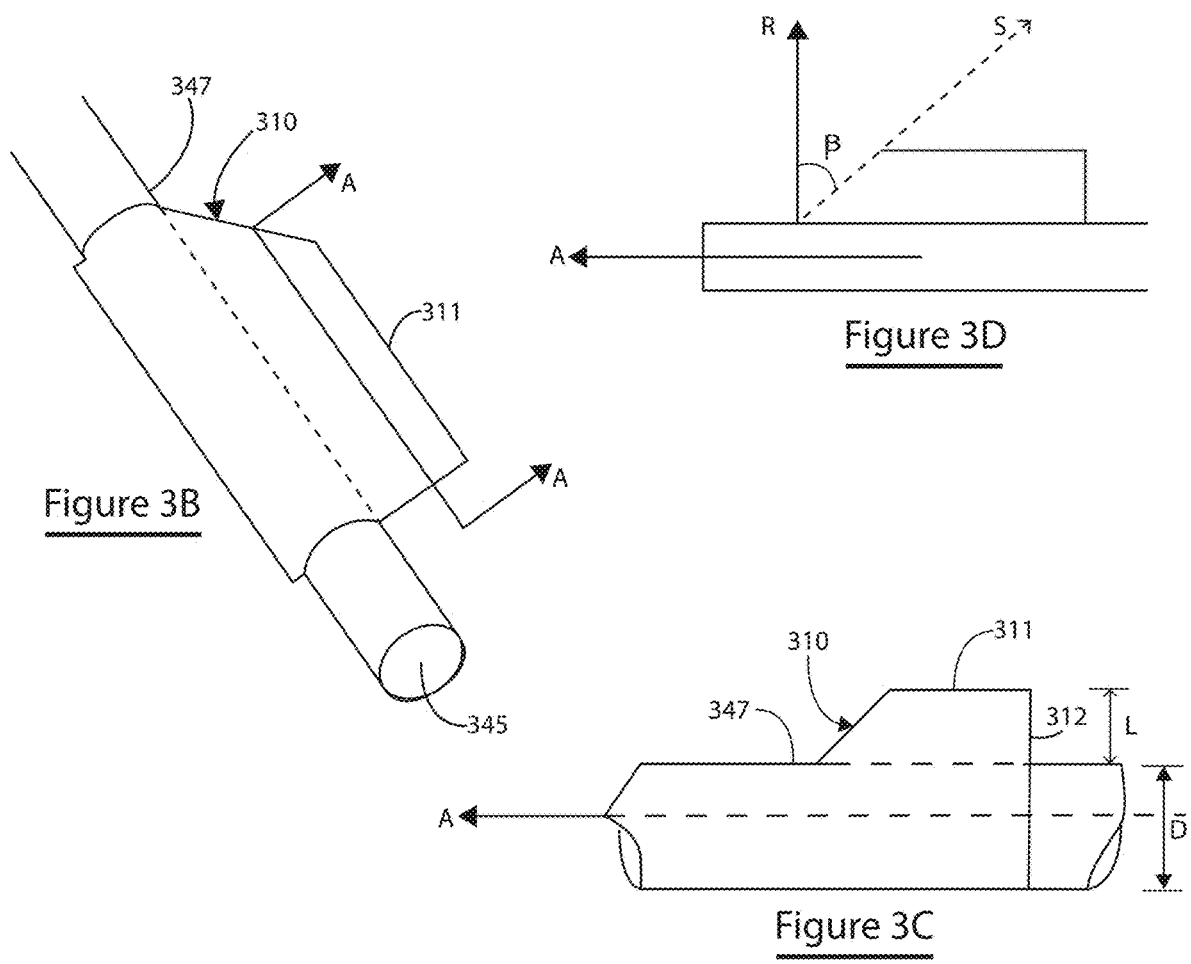
Figure 3B
Figure 3D
Figure 3C

MULTI-LAYERED SANDWICH CABLE FAIRING APPARATUS FOR REDUCING FLAPPING

CROSS-REFERENCE TO RELATED APPLICATIONS

This application claims the benefit of U.S. Provisional Application No. 63/135,034 filed Jan. 8, 2021, titled "Multi-Layered Sandwich Cable Fairing Apparatus and Method for Reducing Flapping," incorporated herein by reference.

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to a sandwich cable fairing designed for attachment to cables that are towed at known operating speeds behind marine vessels, and in particular, a sandwich cable design that combines layers of elastic and damping materials.

BACKGROUND

Cable fairings are structures attached to cables typically towed by marine vessels. They are designed to streamline the water flow around the cable and reduce normal drag and cable vibration caused by vortex shedding. Faired cables are used in applications such as underwater geophysical exploration operations, including towing bodies and cable arrays from ships, and deploying buoys from subsurface water vessels. There are several types of cable fairings used in these operations. Hard fairings are typically made of a mechanical shell that is clamped over sections of the cable. The shells are typically held together with screws or rivets. Another type of fairing is known as a zipper fairing which is made of a reinforced polyethylene (or similar material) that is wrapped around the cable and then sealed (zipped) to itself by the two free ends. There are also hairy fairings, which are hair-like flexible fibers woven into the outer strands of a tow cable. Another known type of fairing is the ribbon fairing, Ribbon fairings are typically flexible rectangular pieces of fabric or other material that are often woven into the outer strands of an armored tow cable.

Typically, ribbon fairings are all one material, or are constructed of fiber reinforced fabric materials to reduce breakage and damage due to use. While these ribbon fairings create decoherence in the vortex shedding behind cables which greatly reduces the vortex shedding induced vibrations of the cable, they do not induce significant damping in the fairing itself. When towed in a flow, these fairings can undergo large flapping motions, just as a flag does. At high speeds and more acute towing angles, these flapping motions increase and cause a significant amount of vibration and wear on the fairings.

Therefore, what is needed is a fairing material that minimizes fairing flapping thereby significantly reducing the incremental vibration created by existing ribbon fairings.

SUMMARY

Disclosed is sandwich cable fairing that combines layers of different elastic and damping materials to create a stiffer ribbon fairing than previously known. The fairing can prevent and dampen the vibration that results from the high frequency flapping caused by a cable being towed at a relatively high rate of speed. The fairing retains enough flexibility to wrap around the cable during handling operations.

In one aspect, the invention is a mono-ribbon sandwich cable fairing having several layers that are sandwiched together. The mono-ribbon sandwich cable fairing is constructed with a single piece of fiber-reinforced adhesive tape. The construction is achieved by cutting adhesive tape into a ribbon shape and weaving it into cable armor strands so that the adhesive halves of the ribbon face each other. These adhesive halves are then folded and pressed together to effectively create a mono-ribbon with seven layers.

From the outsides of the fairing and working inwards, the two outermost layers are polymer only layers covering the non-adhesive side of the unfolded piece of tape. The next two layers are high stiffness layers. These layers of the tape are made stiff by the reinforcing material composed of fibers running at least partially along the length of the ribbon. The next two layers are the polymer layers of the unfolded tape on its adhesive side. The inner, seventh layer is a high viscosity layer and comprises the conjoined adhesive of the tape. The resulting seven-layer cable fairing exhibits higher bending stiffness and greater damping than a standard ribbon fairing, or any existing ribbon fairing composed of non-reinforced tape.

In another aspect, the invention is a towing system in a water environment, having a cylindrical cable having an outer circumferential surface, and a plurality of sandwich cable fairings. In this aspect, each of the plurality of the sandwich cable fairings is wrapped around the outer cylindrical surface of the cylindrical cable. According to the invention, each sandwich cable fairing has a contacting portion contacting the outer cylindrical surface of the cylindrical cable, a first leg extending from the contacting portion, and a second leg extending from the contacting portion. The first leg and the second leg extend radially away from the cylindrical cable, and the first leg and the second leg adhere to each other creating seven layers. In this aspect, and from the outermost layers working inwards, the seven layers are a first outer layer of elastic material, a second outer layer of elastic material, a third layer of stiffness material comprising a reinforced fiber material attached to the first outer layer of elastic material between the first layer of elastic material and the second layer of elastic material. Also included is a fourth layer of stiffness material comprising a reinforced fiber material attached the second outer layer of elastic material between the first and second layer of elastic material, and a fifth layer of polymer material attached to the third layer of stiffness material between the third layer of stiffness material and the fourth layer of stiffness material. The seven layers also include a sixth layer of polymer material attached the fourth layer of stiffness material between the third layer of stiffness material and the fourth layer of stiffness material, and a seventh layer of material comprising adhesives attached to and between the fifth layer of polymer material and the sixth layer of polymer material.

In another aspect, the invention is a sandwich cable fairing for a cylindrical cable of a towing system. According to the invention, the sandwich cable fairing includes a contacting portion for contacting an outer cylindrical surface of the cylindrical cable, a first leg extending from the contacting portion, and a second leg extending from the contacting portion. In this aspect, the first and second leg adhere to create seven layers. The seven layers include a first outer layer of elastic material, a second outer layer of elastic material, and a third layer of stiffness material comprising a reinforced fiber material attached to the first outer layer of elastic material between the first layer of elastic material and the second layer of elastic material. The seven layers also include a fourth layer of stiffness material comprising a reinforced fiber material attached the second outer layer of elastic material between the first and second layer of elastic material. Also included is a fifth layer of polymer material attached to the third layer of stiffness material between the third layer of stiffness material and the fourth layer of stiffness material, and a sixth layer of polymer material attached the fourth layer of stiffness material between the third layer of stiffness material and the fourth layer of stiffness material. In this aspect, the seven layers also include a seventh layer of material comprising adhesives attached to and between the fifth layer of polymer material and the sixth layer of polymer material.

BRIEF DESCRIPTION OF THE DRAWINGS

Other features will be apparent from the description, the drawings, and the claims.

FIG. 1A is an exemplary perspective view of a seven-layer mono-ribbon chevron sandwich cable fairing constructed from a reinforced adhesive tape, according to an embodiment of the invention.

FIG. 1B is an exemplary explanatory illustration of a mono-ribbon sandwich cable fairing of FIG. 1A, showing the legs and the vertex of the sandwich cable fairing, according to an embodiment of the invention.

FIG. 3A is an exemplary sectional view of a seven-layer mono-ribbon sandwich cable fairing constructed from a reinforced adhesive tape, according to an embodiment of the invention.

FIG. 3B is an exemplary perspective view of a seven-layer mono-ribbon sandwich cable fairing constructed from a reinforced adhesive tape, showing a chamfer, according to an embodiment of the invention.

FIG. 3C is an exemplary side view of a seven-layer mono-ribbon sandwich cable fairing constructed from a reinforced adhesive tape, showing a chamfer, according to an embodiment of the invention.

FIG. 3D is an exemplary side view of a seven-layer mono-ribbon sandwich cable fairing, showing the chamfer angle, according to an embodiment of the invention.

FIG. 5 is an exemplary sectional illustration of the mono-ribbon sandwich cable fairing, showing the seven-layer sections A-A of FIGS. 1A and 3B, according to an embodiment of the invention.

DETAILED DESCRIPTION

Figure 2A:
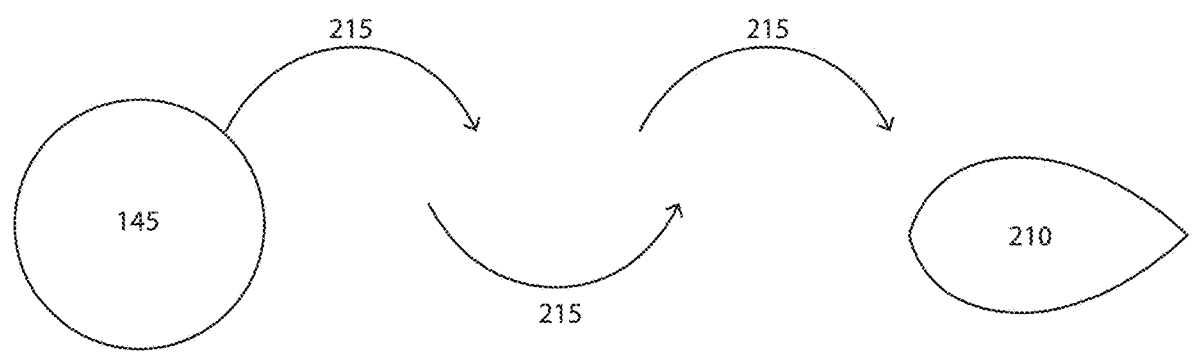
FIG. 2A is an exemplary explanatory illustration of a towing system having a cylindrical cable and an object downstream of the cable, according to an embodiment of the invention.

FIG. 1A is an exemplary perspective view of a preferred embodiment of the mono-ribbon sandwich cable fairing 100 with seven layers. The mono-ribbon sandwich fairing 100 is constructed from multi-layered fiber reinforced tape in a chevron ribbon shape as shown in FIG. 1A. A standard mono ribbon shape may also be used in an alternative embodiment.

FIG. 1B is an exemplary explanatory illustration of a mono-ribbon sandwich cable fairing 100 of FIG. 1A. As shown in the schematic illustration of FIG. 1B, the mono-ribbon sandwich cable fairing 100 of FIG. 1A has legs 101a and 101b, which may described interchangeably as a first leg and a second leg, extending from a first side and a second side of the vertex. The legs 101a and 101b merely represent the portions of the ribbon that extend from the vertex 102. Typically, the vertex 102, the area where the ribbon is folded over, is located at a central portion of the ribbon. As outlined below, the seven layers of the embodiment of FIG. 1A results from the folding over of the ribbon structure and adhering the legs 101a and 101b together, with an adhesive, to form a single seven-layer structure.

Returning to FIG. 1A, according to an embodiment, the legs of the ribbon (101a and 101b shown in FIG. 1B) are woven around a single strand or multiple strands of the armor of the cable at a middle portion of the ribbon and adhered together to form a single or mono-ribbon. For the chevron ribbon shape, when the legs of the ribbon are adhered together, the mono-ribbon sandwich ribbon fairing's angle α, relative to a tow angle (the angle at which the cable 145 is being towed) is less than 90 degrees as shown in FIG. 1A. For a standard mono ribbon shape, the relative angle α to the tow angle of the cable is 90 degrees.

Because fiber-reinforced tape is used, when the ribbon is folded and the legs adhered together, seven layers of material are effectively created. FIG. 5 is an exemplary sectional illustration of the mono-ribbon sandwich cable fairing 100, showing the seven-layer section A-A of FIG. 1A, according to an embodiment of the invention As shown, there is a first polymer layer 105 and a second polymer layer 110. When folded over, the first polymer layer 105 and the second polymer layer 110 form the "bread" in the sandwich fairing 100. There is a third layer 115 and a fourth layer 120 between the first polymer layer 105 and second polymer layer 110. These intermediate third 115 and fourth 120 layers have improved and increased stiffness qualities that result from the reinforced material of the tape. The reinforced material of intermediate layers 115 and 120 includes a fiber material running longitudinally along the length of the ribbon to stiffen the structure.

FIG. 5 also shows a fifth layer 125 and a sixth layer 130 located between the third layer 115 and the fourth layer 120. The fifth layer 125 and the sixth layer 130 are the polymer layers of the tape, between which is an inner layer 135, which bonds the folded over ribbon structure, thereby forming the mono-ribbon sandwich cable fairing 100. The inner/seventh layer 135 is an adhesive, which inherently is a material of high viscoelasticity, and which provides for the adhesive functionality of the layer. According to a method of making the invention, before the ribbon is folded over, the adhesive layer is applied to one side of the ribbon. Typically, the ribbon is prefabricated with a layer of adhesive. Then the ribbon is folded over so that the adhesive layer folds over upon itself, thus forming a conjoined adhesive layer 135.

According to the embodiment of the invention shown in FIG. 1A, the mono-ribbon fairing 100 is flexible at the point where it is woven around cable strands, while having the requisite stiffness behind the cable 145 to reduce the amplitude of waving, thus, decreasing hydrodynamic drag and vibration. Depending on the fairings stiffness, the middle high viscosity layer 135 may also provide damping which can further reduce vibration and drag. Generally speaking, the cable fairing 100 dampens the vibration resulting from the frequency of flapping caused by a cable being towed at operational speeds. The layering of materials allows the fairing 100 to have the flexibility to be crushed by cable equipment while maintaining the requisite stiffness to reducing flapping and the resulting vibration.

FIG. 1A also shows the mono-ribbon sandwich cable fairing 100 having a length L, a width W, and a thickness T. FIG. 1 also shows the cable 145 having a diameter D, and a central longitudinal axis A that extends in the Z direction. FIG. 1 shows the mono-ribbon sandwich cable fairing 100 being rectangular and extending in an XZ plane by virtue of its length L and width W. The cable fairing 100 is attached to the cable 145 in such a manner that the XZ plane of the cable fairing 100 intersects the central longitudinal axis A of the cable 145. This structural arrangement allows the cable fairing 100 to be substantially parallel to the horizontal during towing operations, as the cable fairing 100 is also substantially parallel to the horizontal.

According to an embodiment of the invention, the length L of the rectangular strip is about 3 to 10 times the diameter D of the cable 145. According to this embodiment, the width W of the rectangular strip is about 0.2 to about 1.5 times the diameter D of the cable 145, which is being faired. According to another embodiment of the invention, the length L is about 6 D and the width W is 1.2 D, where D is the diameter of the cable 145, which is being faired.

As stated above, cable fairings 100 outlined in this invention are attached to cables 145 typically towed by marine vessels. It should be understood that occasionally in towed system design, a strut or other object is placed directly downstream of a cylindrical cable. FIG. 2A is an explanatory illustration of a towing system having a cylindrical cable 245 and an object 210 downstream of the cable 145. FIG. 2A also shows vortices 215 shed by the cable 145. In these scenarios, the vortices 215 shed by the cable can cause severe vibration as they impinge on the downstream object 210.

Figure 2B:
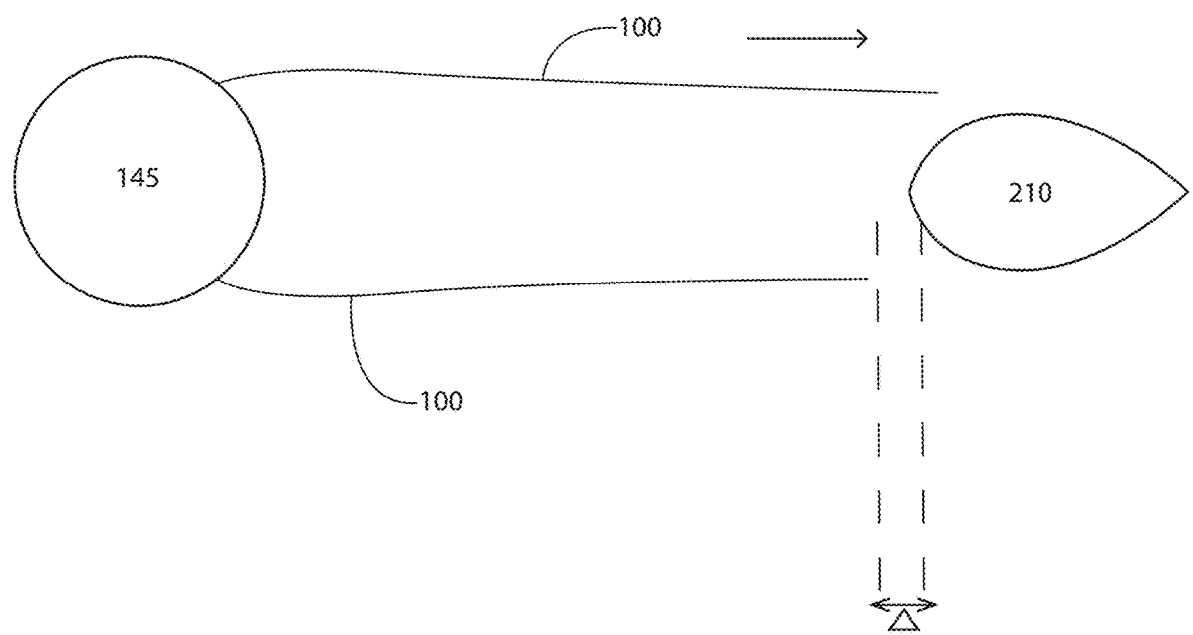
FIG. 2B is an exemplary explanatory illustration of a towing system having a cylindrical cable and an object downstream of the cable, with the sandwich ribbon fairing of FIG. 1A, according to an embodiment of the invention.

FIG. 2B is an explanatory illustration of a towing system having a cylindrical cable 145 and an object 210 downstream of the cable 145. To reduce or eliminate the vibration on both the upstream cylindrical cable 145 and the downstream object 210, sandwich fairings 100 are placed on either side of the upstream cylindrical cable, and extend toward the object, so that in the downstream direction Y, there is a gap A, between the object 210 and the end of the aft end of the fairing 100. The sandwich fairings 100 as positioned in FIG. 2B introduce porous walls in the gap between the cylindrical cable 145 and the object 210. The sandwich fairings also prevent the formation of vortices (shown in FIG. 2A). Regarding the system of FIG. 2B, the fairings 100 do not flap, which allows them to endure the high operational speeds without damaging vibrations.

FIG. 3A is an exemplary sectional view of a seven-layer mono-ribbon sandwich cable fairing 300 constructed from a reinforced adhesive tape, according to an embodiment of the invention. As shown, the sandwich cable fairing 300 is wrapped around a cylindrical cable 345. FIGS. 3B and 3C are exemplary perspective views of the seven-layer mono-ribbon sandwich cable fairing 300, showing a chamfer, according to an embodiment of the invention.

FIG. 3A shows the sandwich cable fairing 300 having a contacting portion 301 for contacting the outer cylindrical surface 347 of the cylindrical cable 345. FIG. 3A also shows the sandwich cable fairing 300 having a first leg 303 and a second leg 305, the two legs adhered together to form the seven layer arrangement shown in FIG. 5. As shown, the first leg 303 and the second leg 305 extend radially away from the cylindrical cable 345.

FIGS. 3B and 3C show that the sandwich cable fairing 300 includes a chamfer 310. As shown, the chamfer extends diagonally from the cable surface 347 to a top side 311 of the ribbon. As shown, the top side 311 extends in a direction that is substantially parallel to the central axis A of the cable 345. It should be noted that the chamfer 310 as shown in FIGS. 3B and 3C, is included in both the first leg 303 and the second leg 305, shown in FIG. 3A. According to one particular embodiment, L is about equal to D.

FIG. 3D is an exemplary side view of a seven-layer mono-ribbon sandwich cable fairing 300, showing the chamfer angle β, according to an embodiment of the invention. As shown, the angle β is the angle between the diagonal line S (which extends along the chamfer) and the line R. The line R extends in a direction, perpendicular to the central axis A of the cable 345. According to an embodiment of the invention the chamfer angle β may range from about 30 degrees to about 70 degrees. According to a particular embodiment, the chamfer angle β is 45 degrees.

It should be understood that the sandwich cable fairing 300, shown in FIGS. 3A, 3B, and 3C is layered as illustrated in FIG. 5. FIG. 5 is an exemplary sectional illustration of the mono-ribbon sandwich cable fairing, showing the seven-layer sections A-A of FIG. 3B, according to an embodiment of the invention. As stated above, the seven-layer arrangement is formed when the first and second legs (303 and 305 shown in FIG. 3A) are adhered together. Therefore, as shown, the sandwich cable fairing 300 includes, a first polymer layer 105 and a second polymer layer 110. The first polymer layer 105 and the second polymer layer 110 form the "bread" in the sandwich fairing 300. There is a third layer 115 and a fourth layer 120 between the first polymer layer 105 and second polymer layer 110. These intermediate third 115 and fourth 120 layers have increased stiffness qualities that result from the reinforced material of the tape.

FIG. 5 also shows the cable fairing 300 having a fifth layer 125 and a sixth layer 130 located between the third layer 115 and the fourth layer 120. The fifth layer 125 and the sixth layer 130 are the polymer layers of the tape, between which is an inner layer 135, which is an adhesive, which inherently has a high viscosity. It should be noted that the contacting portion 301 (shown in FIG. 3A) is essentially the unfolded and non-conjoined portion of the ribbon, and thus comprises only three layers, i.e., a reinforced layer, which may be a fiber material, a polymer layer and an adhesive layer. As stated above, the contacting portion 301 is for contacting the outer cylindrical surface 347 of the cylindrical cable 345.

Figure 4A:
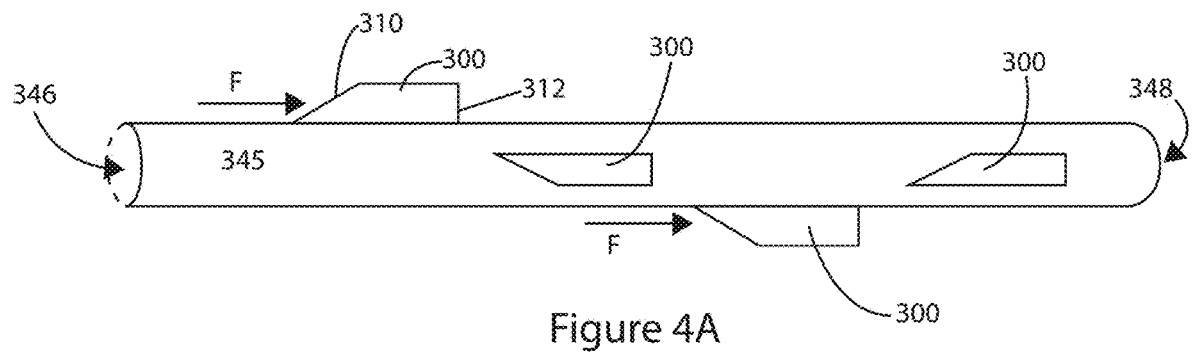
FIG. 4A is an exemplary explanatory side view of a towing system having a cylindrical cable and an arrangement of seven-layer mono-ribbon chevron sandwich cable fairings, according to an embodiment of the invention.

FIG. 4A is an exemplary explanatory side view of a towing system 400 in operation in open water, such as the sea, a river, or a lake, e.g., having a cylindrical cable 345 and an arrangement of seven-layer mono-ribbon chevron sandwich cable fairings 300, according to an embodiment of the invention. As shown, the cable 345 has a fore region 346 and an aft region 348, which is toward the end at which an object (not shown) is towed. As shown, a plurality of sandwich cable fairings 300 are longitudinally spaced along the length of the cable 345.

Figure 4B:
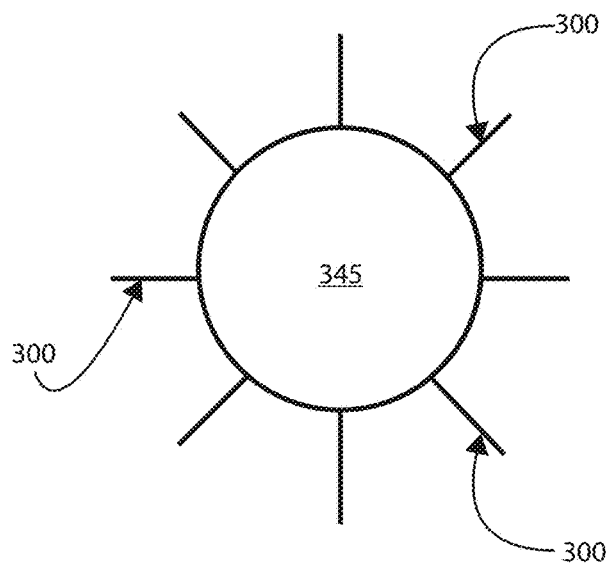
FIG. 4B is an exemplary explanatory sectional view of a towing system having a cylindrical cable and an arrangement of seven-layer mono-ribbon chevron sandwich cable fairings, according to an embodiment of the invention.

FIG. 4A also shows the direction of the flow F of the water, which is substantially parallel to the direction of the axis A of the cable. According to an embodiment of the invention, in operation the flow F and the axis A are substantially parallel to the horizontal direction. As shown, the sandwich cable fairings 300 are arranged so that chamfer 310 faces the flow F, so that in towing operations, the flow first impacts the chamfer 310 of the cable fairing 300, which is at a fore end of the sandwich cable fairing 300. For each sandwich cable fairing 300, the flow F goes past the tail end 312 last. FIG. 4B is an exemplary explanatory sectional view of the towing system 400 having the cylindrical cable 300 and an arrangement of seven-layer mono-ribbon sandwich cable fairings 300, according to an embodiment of the invention. As shown the cable fairings 300 are positioned so that they extend in different radial directions at the surface of the cable 345.

It should be understood that the fairings 300 shown in FIG. 4B are the fairings shown in FIG. 4A, which extend from a fore region 346 to the aft region 348 of the cable 345. It should also be understood that any number of cable fairings 300 may be commensurate with the length of the cable 345. The arrangement of the cable fairings as shown in FIGS. 4A and 4B, with the chamfer 310 positioned with respect to the flow F, as shown in FIG. 4A, produces the desired effect of reducing flapping in the cable 345. Generally speaking, the fairings 300 dampen the vibration resulting from the frequency of flapping caused by a cable being towed at operational speeds. The layering of materials allows each fairing 300 to have the flexibility to be crushed by cable equipment while maintaining the requisite stiffness to reducing flapping and the resulting vibration.

What has been described and illustrated herein are preferred embodiments of the invention along with some variations. The terms, descriptions and figures used herein are set forth by way of illustration only and are not meant as limitations. For example, the fairing 300 in illustration of FIG. 4A, may also be a stub fairing. Stub fairings work well with flow mostly parallel to the cable axis, and ribbons work well when the flow is mainly perpendicular to the cable axis. Those skilled in the art will recognize that many variations are possible within the spirit and scope of the invention, which is intended to be defined by the following claims and their equivalents, in which all terms are meant in their broadest reasonable sense unless otherwise indicated.

What is claimed:

1. A sandwich cable fairing for an armored cable, wherein the armored cable is towed at a given angle to a flow and has a given diameter, the sandwich cable fairing comprising:
   a multilayered chevron shaped mono-ribbon comprising:
      a vertex having a given angle;
      a first leg extending from a first side of the vertex; and
      a second leg extending from a second side of the vertex, wherein the angle of the vertex is twice the given tow angle of the cable, and wherein the chevron shaped mono-ribbon is woven into armor strands of the cable such that the first leg and the second leg of the mono-ribbon wrap around the armor strands and adhere to each other creating seven layers comprising:
         a first outer layer of elastic material;
         a second outer layer of elastic material;
         a third layer of stiffness material comprising a reinforced fiber material attached to the first outer layer of elastic material between the first layer of elastic material and the second layer of elastic material;
         a fourth layer of stiffness material comprising a reinforced fiber material attached the second outer layer of elastic material between the first and second layer of elastic material;
         a fifth layer of polymer material attached to the third layer of stiffness material between the third layer of stiffness material and the fourth layer of stiffness material;
         a sixth layer of polymer material attached the fourth layer of stiffness material between the third layer of stiffness material and the fourth layer of stiffness material; and
         a seventh layer of material comprising adhesives attached to and between the fifth layer of polymer material and the sixth layer of polymer material.

2. The sandwich cable fairing of claim 1, wherein the first and second layers of elastic material are a polyurethane material.

3. The sandwich cable fairing of claim 1, wherein the reinforced fiber material of the third and fourth layers include fibers running at least partially in the direction of length of the mono-ribbon.

4. The sandwich cable fairing of claim 1, wherein the sandwich cable fairing is rectangular and extends in an XZ plane, and wherein the armored cable has a central longitudinal axis A extending in a Z axis direction, and wherein the XZ plane of the rectangular sandwich cable fairing intersects the longitudinal axis A, and wherein during towing operations the cable fairing is substantially parallel to a horizontal direction.

5. A towing system in a water environment, having a cylindrical cable having an outer circumferential surface, and a plurality of sandwich cable fairings, wherein each of the plurality of the sandwich cable fairings is wrapped around the outer cylindrical surface of the cylindrical cable, and each sandwich cable fairing comprises:
   a contacting portion contacting the outer cylindrical surface of the cylindrical cable;
   a first leg extending from the contacting portion; and
   a second leg extending from the contacting portion, wherein the first leg and the second leg extend radially away from the cylindrical cable, and wherein the first leg and the second leg adhere to each other creating seven layers comprising:
      a first outer layer of elastic material;
      a second outer layer of elastic material;
      a third layer of stiffness material comprising a reinforced fiber material attached to the first outer layer of elastic material between the first layer of elastic material and the second layer of elastic material;
      a fourth layer of stiffness material comprising a reinforced fiber material attached the second outer layer of elastic material between the first and second layer of elastic material;
      a fifth layer of polymer material attached to the third layer of stiffness material between the third layer of stiffness material and the fourth layer of stiffness material;
      a sixth layer of polymer material attached the fourth layer of stiffness material between the third layer of stiffness material and the fourth layer of stiffness material; and
      a seventh layer of material comprising adhesives attached to and between the fifth layer of polymer material and the sixth layer of polymer material.

6. The towing system of claim 5, wherein each sandwich cable fairing comprises a chamfer and a top side, wherein the chamfer extends diagonally from the cable surface to the top side, and wherein the top side extends parallel to a central axis A of the cylindrical cable, and wherein the towing system is oriented so that a flow of water F is substantially parallel to the central axis A of the cylindrical cable, and for each sandwich able fairing, the flow F first impacts the chamfer before going past a tail end.

7. The towing system of claim 6, wherein the chamfer has a chamfer angle β, which is the angle between a diagonal line S which extends along the chamfer and a line R which extends perpendicularly through the central axis A, wherein the chamfer angle β is between 30 degrees and 70 degrees.

8. The towing system of claim 7, wherein the plurality of sandwich cable fairings are longitudinally spaced along the cylindrical cable.

9. The towing system of claim 8, wherein the plurality of sandwich cable fairings are longitudinally radially spaced around the outer circumferential surface of the cylindrical cable.

10. The towing system of claim 9, wherein the chamfer angle β is 45 degrees.

11. A sandwich cable fairing for a cylindrical cable of a towing system, the sandwich cable fairing comprising:
   a contacting portion for contacting an outer cylindrical surface of the cylindrical cable;
   a first leg extending from the contacting portion; and
   a second leg extending from the contacting portion, wherein the first and second legs adhere to each other to create seven layers comprising:
      a first outer layer of elastic material;
      a second outer layer of elastic material;
      a third layer of stiffness material comprising a reinforced fiber material attached to the first outer layer of elastic material between the first layer of elastic material and the second layer of elastic material;
      a fourth layer of stiffness material comprising a reinforced fiber material attached the second outer layer of elastic material between the first and second layer of elastic material;
      a fifth layer of polymer material attached to the third layer of stiffness material between the third layer of stiffness material and the fourth layer of stiffness material;
      a sixth layer of polymer material attached the fourth layer of stiffness material between the third layer of stiffness material and the fourth layer of stiffness material; and
      a seventh layer of material comprising adhesives attached to and between the fifth layer of polymer material and the sixth layer of polymer material.

12. The sandwich cable fairing of claim 11, further comprising a chamfer and a top side, wherein the chamfer extends diagonally from a cable surface to the top side, and wherein the top side extends parallel to a central axis A of the cylindrical cable, wherein the chamfer has a chamfer angle β, which is the angle between a diagonal line S which extends along the chamfer and a line R which extends perpendicularly through a central axis A of the cylindrical cable, wherein the chamfer angle β is between 30 degrees and 70 degrees.

* * * * *